(12) United States Patent
Harrison (10) Patent No.: US 12,442,301 B2
(45) Date of Patent: Oct. 14, 2025

(54) BALANCING SIMULATION MASS, APPARATUS AND ASSOCIATED METHODS

(71) Applicant: Rolls-Royce plc, London (GB)

(72) Inventor: John M. Harrison, Bristol (GB)

(73) Assignee: Rolls-Royce plc

( * ) Notice: Subject to any disclaimer, the term of this patent is extended or adjusted under 35 U.S.C. 154(b) by 287 days.

(21) Appl. No.: 18/457,621

(22) Filed: Aug. 29, 2023

(65) Prior Publication Data
US 2024/0110483 A1    Apr. 4, 2024

(30) Foreign Application Priority Data

Sep. 30, 2022 (GB) .................................... 2214331

(51) Int. Cl.
*F01D 5/02* (2006.01)
*F16F 15/32* (2006.01)
*G01M 1/36* (2006.01)

(52) U.S. Cl.
CPC .............. *F01D 5/027* (2013.01); *F16F 15/32* (2013.01); *G01M 1/36* (2013.01); *F05D 2260/15* (2013.01)

(58) Field of Classification Search
CPC ........... F01D 5/027; F16F 15/32; G01M 1/36; F05D 2260/15
See application file for complete search history.

(56) References Cited

U.S. PATENT DOCUMENTS

| | | | |
|---|---|---|---|
| 2002/0148276 A1 | 10/2002 | Goebel | |
| 2011/0083505 A1* | 4/2011 | Allen, IV | G01M 1/26 73/487 |

FOREIGN PATENT DOCUMENTS

| | | | | |
|---|---|---|---|---|
| DE | 102019113500 A1 | * | 11/2020 | ............. G01M 1/32 |
| EP | 2803867 A2 | * | 11/2014 | ........... F04D 29/662 |
| EP | 3214421 A1 | * | 9/2017 | ............. G01M 1/16 |

OTHER PUBLICATIONS

Great Britain search report dated Mar. 22, 2023, issued in GB Patent Application No. 2214331.7.
European Search Report for Application No. 23193846, dated Jan. 22, 2024, 5 pages.

* cited by examiner

*Primary Examiner* — Jamel E Williams
(74) *Attorney, Agent, or Firm* — Barnes & Thornburg (57) ABSTRACT

Disclosed is a rotary disc balancing simulation mass for balancing a rotary disc configured to support a set of rotary components, wherein the rotary disc balancing simulation mass is configured to be attached to the rotary disc and configured to simulate the mass of two or more of the rotary components. Also disclosed are balancing simulation apparatus, and methods of balancing a rotary disc.

14 Claims, 9 Drawing Sheets

BALANCING SIMULATION MASS, APPARATUS AND ASSOCIATED METHODS

CROSS-REFERENCE TO RELATED APPLICATIONS

This specification is based upon and claims the benefit of UK Patent Application No. GB 2214331.7, filed on 30 Sep. 2023, which is hereby incorporated herein in its entirety.

BACKGROUND

Technical Field

The present disclosure concerns balancing of rotary discs and, in particular, balancing simulation for rotary discs.

Description of the Related Art

It is necessary to balance a rotary disc to ensure its compatibility with any component set. It is known to balance a rotary disc either by installing the component set on the disc or by installing a corresponding set of individual dummy masses, which each simulate an individual component of the component set. These approaches can be time consuming and may introduce many sources for error.

It will be appreciated that improvements in relation to rotary disc balancing are desirable.

SUMMARY

According to a first aspect of the present disclosure, there is provided a rotary disc balancing simulation mass for balancing a rotary disc configured to support a set of rotary components, wherein the rotary disc balancing simulation mass is configured to be attached to the rotary disc and configured to simulate the mass of two or more of the rotary components.

The rotary components may comprise a plurality of individual rotary components. The rotary components may be configured to be attached to the rotary disc so as to rotate about a rotation axis of the rotary disc. The set of rotary components may be configured to be circumferentially spaced around the rotary disc.

The rotary disc to which the rotary disc balancing simulation mass may be configured to be attached comprises a plurality of attachment features corresponding to the set of rotary components. The rotary disc balancing simulation mass may be further configured to: simulate the mass of a first number of the set of rotary components, the first number being two or more and; attach to a second number of the plurality of the attachment features, the second number being less than the first number.

The rotary disc balancing simulation mass may be configured to simulate the mass of a number of rotary components, but to attach to fewer attachment features than the number of rotary components the mass simulates.

The set of rotary components may be configured to be circumferentially spaced around the rotary disc. The rotary disc balancing simulation mass may be configured to extend at least partially circumferentially around the rotary disc whilst attached to the rotary disc.

The rotary disc balancing simulation mass may comprise a substantially annular mass configured to extend substantially circumferentially around the rotary disc. The rotary disc balancing simulation mass may be configured to simulate the mass of the entire set of rotary components.

The set of rotary components may consist of a third number of rotary components. The rotary disc may comprise the third number of attachment features corresponding to the set of rotary components. The rotary disc balancing simulation mass may comprise a fourth number of attachment features for attaching to the rotary disc, the fourth number being a factor of the third number.

The third number may have at least three factors, or may not be a prime number.

The rotary disc balancing simulation mass may further comprise one or more radially extending feet configured to be attached to the rotary disc.

The rotary disc balancing simulation mass may further comprise a plurality of radially extending feet. At least one of the radially extending feet may be configured to provide a radial force to be reacted against the other radially extending feet and thereby secure the rotary disc balancing simulation mass to the rotary disc.

The foot or feet may be radially moveable with respect to the rotary disc balancing simulation mass.

The rotary disc may comprise a plurality of root slots corresponding to the set of rotary components and a plurality of disc posts positioned between the root slots. The rotary disc balancing simulation mass may comprise one or more attachment features configured to: i) be received in one or more of the root slots; and/or ii) attach to one or more of the disc posts, optionally by clamping.

The rotary disc may be a rotor of a gas turbine engine, optionally a fan disc, a compressor disc, or a turbine disc of a gas turbine engine. The rotary components may be blades to be supported by the rotor, optionally fan blades, compressor blades, or turbine blades.

According to a second aspect of the present disclosure, there is provided a balancing simulation mass apparatus comprising a plurality of rotary disc balancing simulation masses according to the first aspect. The plurality of rotary disc balancing simulation masses may be configured to simulate the entire set of rotary components.

According to a third aspect of the present disclosure, there is provided a balancing simulation apparatus comprising: a rotary disc to be balanced, the disc being configured to support a plurality of circumferentially spaced rotary components; and a rotary disc balancing simulation mass or a balancing simulation mass apparatus configured to simulate the mass of two or more of the rotary components.

According to a fourth aspect of the present disclosure, there is provided a method of balancing a rotary disc, the method comprising: providing a rotary disc configured to support a plurality of rotary components; attaching a balancing simulation mass to the rotary disc in a first position, the balancing simulation mass being configured to simulate the mass of two or more of the rotary components; and rotating the rotary disc with the balancing simulation mass attached.

The method of balancing a rotary disc may further comprise: detaching the balancing simulation mass from the rotary disc; reattaching the balancing simulation mass to the rotary disc in a second position different from the first position; and rotating the rotary disc with the balancing simulation mass reattached.

The balancing simulation mass may be a rotary disc balancing simulation mass according to the first aspect or a balancing simulation mass apparatus according to the second aspect.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
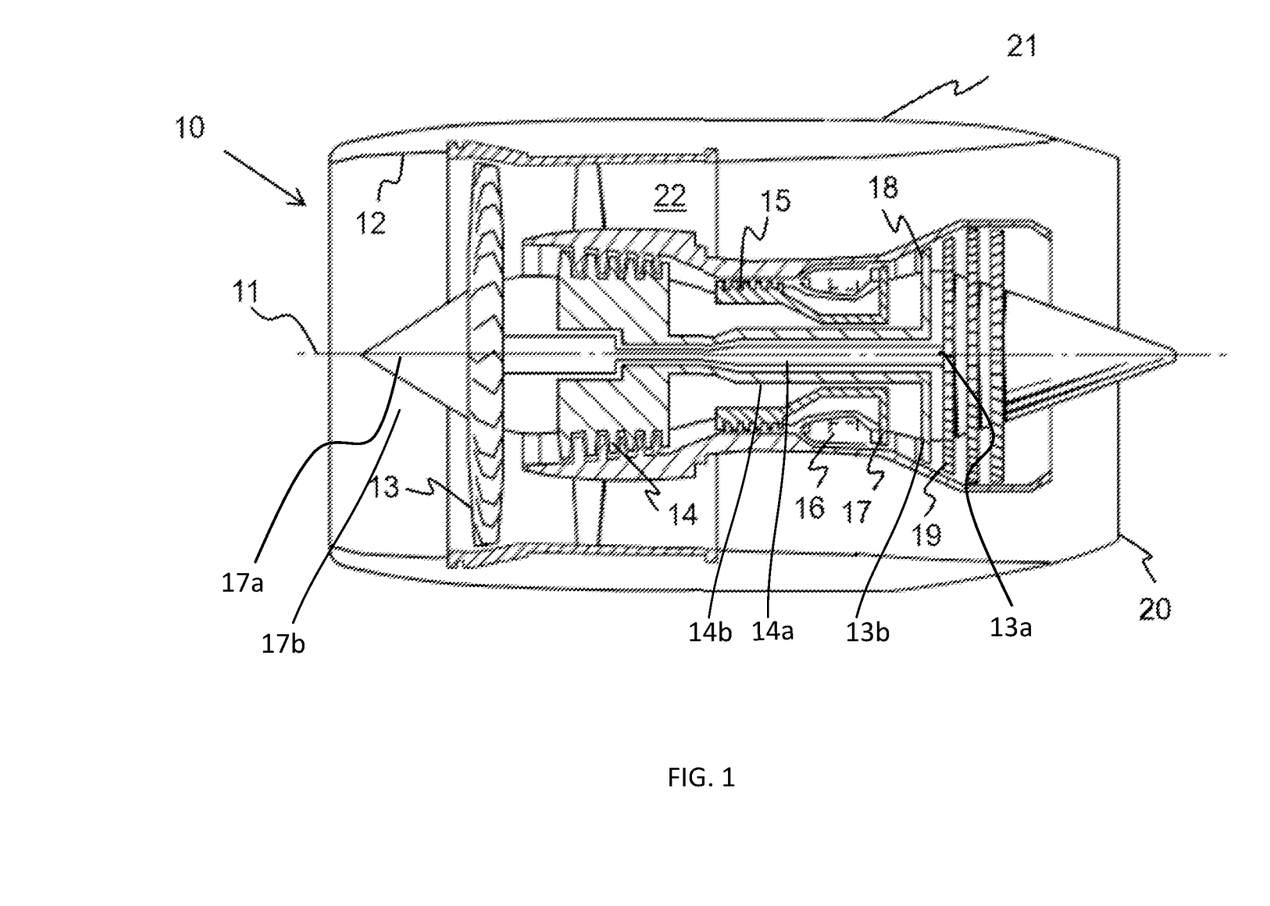
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13 comprising a fan disc 13a and fan blades 13b, an intermediate pressure compressor 14 and a high-pressure compressor 15, each comprising compressor discs 14a with corresponding compressor blades 14b, combustion equipment 16, a high-pressure turbine 17, an intermediate pressure turbine 18 and a low-pressure turbine 19, each comprising turbine discs 17a and corresponding turbine blades 17b, and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate, and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g., two) and/or an alternative number of compressors and/or turbines. Further the engine may comprise a gearbox provided in the drive train from a turbine to a compressor and/or fan.

Figure 2:
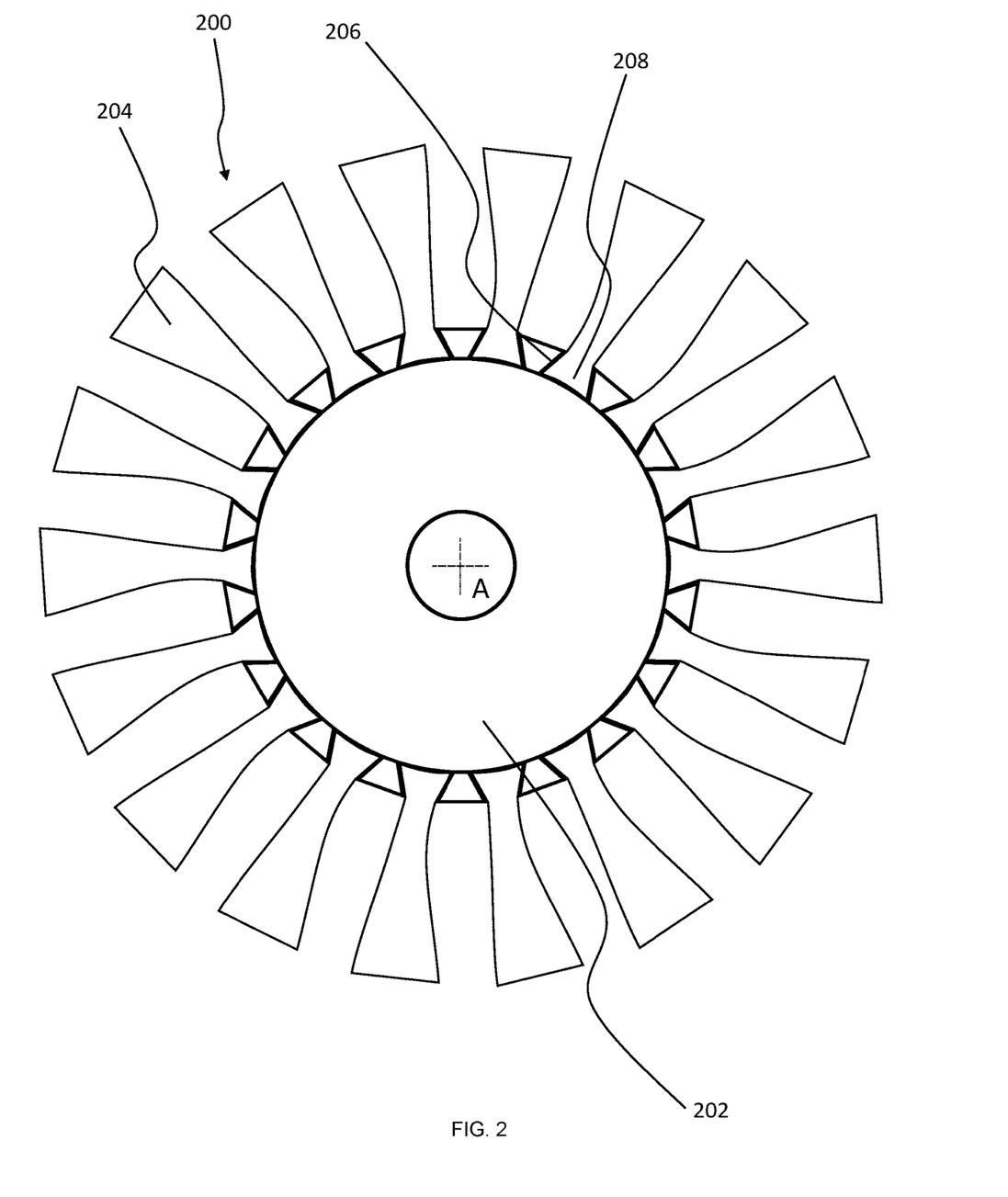
FIG. 2 is a schematic view of a first prior art arrangement.

FIG. 2 shows a prior art apparatus 200 comprising a rotary disc. In this example, the apparatus 200 is a fan apparatus such that the rotary disc is a fan disc, and the rotary components are fan blades. However, it should be understood that the principles of this disclosure can be applied to rotary apparatus of various types including, but not limited to, gas turbine engine rotors such as fan discs, a compressor discs, or a turbine discs (and rotary components in the form of their respective blades), or components of electrical machines, such as motor rotors (and rotary components in the form of their magnets).

The apparatus 200 comprises a fan disc 202 and a plurality of fan blades 204 and, in particular, eighteen fan blades. The fan disc 202 is configured to be mounted on a shaft (not shown) of a gas turbine engine to be driven rotationally about its centre axis A. The fan disc 202 comprises a plurality of attachment features for the fan blades 204, in the form of a plurality of root slots 206. The root slots 206 are equally circumferentially spaced around the radially outer surface of the fan disc 202 and are configured to receive a blade root 208 of a fan blade 204 to attach and secure each fan blade 204 to a respective root slot 206. In this example, the root slots 206 and the blade roots 208 have a 'dovetail' configuration to radially restrain the fan blades 204 on the fan disc 202 during rotation of the fan apparatus 200. The fan disc 202 and or the fan blades 204 may comprise further locking features which secure the blades to the disc, such as end caps to prevent axial movement of the blade roots 208 out of the root slots 206.

In one known procedure for balancing a fan disc, a pre-balanced set of fan blades 204 may be attached to the fan disc 202, and then the fan apparatus 200 rotated and observed using sensors to measure vibration, lateral movement, or other characteristics indicative of imbalance in the fan disc 202 itself. If an imbalance is detected, then modifications can be made to the fan disc 202 to balance it. Repeated tests may be required.

Figure 3:
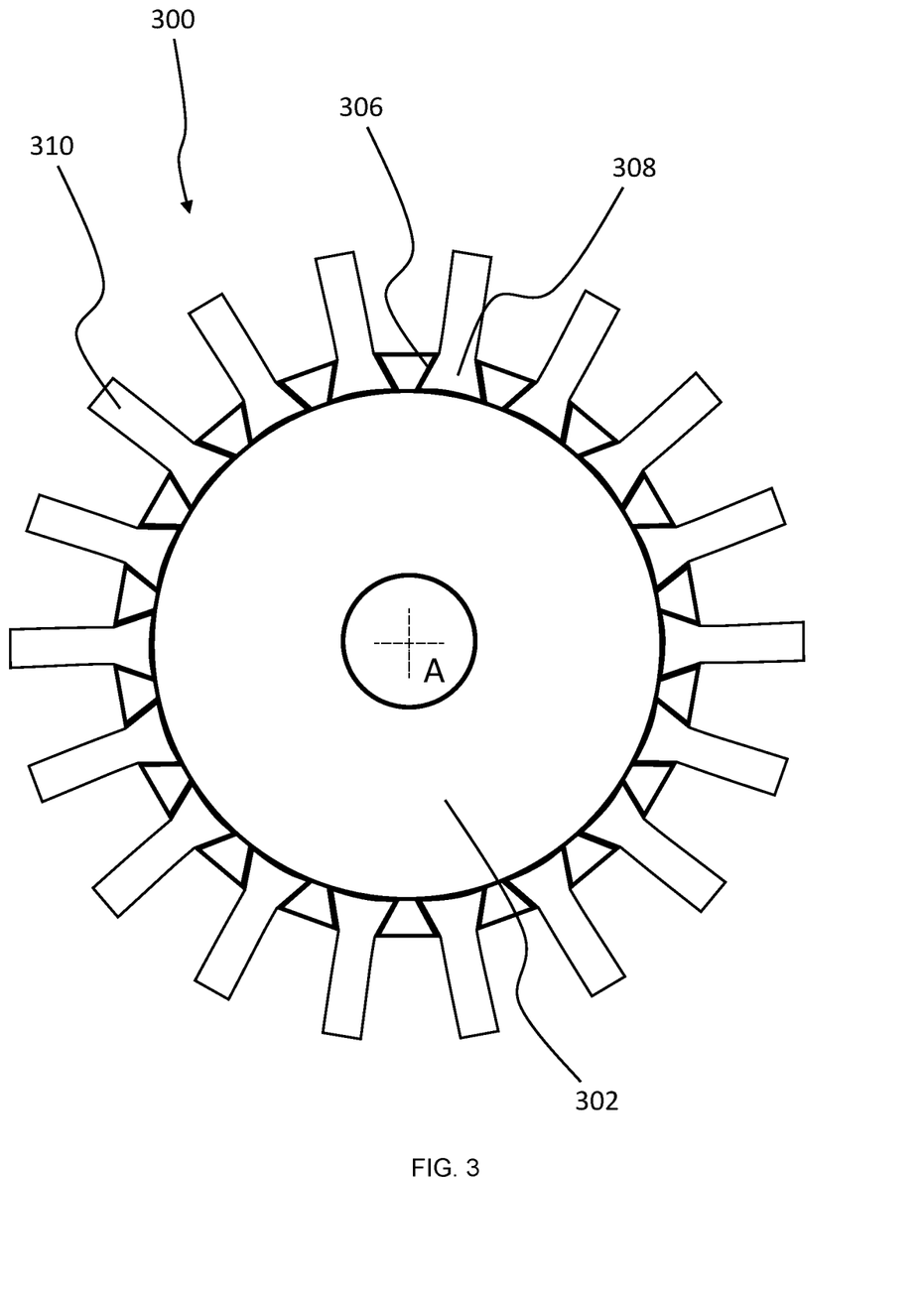
FIG. 3 is a schematic view of a second prior art arrangement.

FIG. 3 shows a further prior art apparatus 300 for balancing a rotary disc. The apparatus 300 is for balancing a fan disc 302. However, it should be understood that the principles of this disclosure can be applied to rotary discs of various types. Like features between FIGS. 2 and 3 are indicated with reference numbers differing by 100.

In a known alternative to the balancing procedure set out with reference to FIG. 2, a set of blade dummy masses 310 are used instead of a set of fan blades. Each fan blade is simulated by a respective blade dummy mass 310. Each dummy mass 310 comprises a dummy root 308 equivalent to the blade roots 208 which is received in a root slot 306 of the fan disc 302. Each blade dummy mass 310 has mass characteristic which simulate the mass of a single fan blade. The set of dummy masses 310 is pre-balanced such that the set of dummy masses 310 can be attached to the fan disc 302, and then the apparatus 300 rotated and observed using sensors to measure vibration, lateral movement, or other characteristics indicative of imbalance in the fan disc 302 itself. If an imbalance is detected, then modifications can be made to the fan disc 302 to balance it. Repeated tests may be required.

Figure 4:
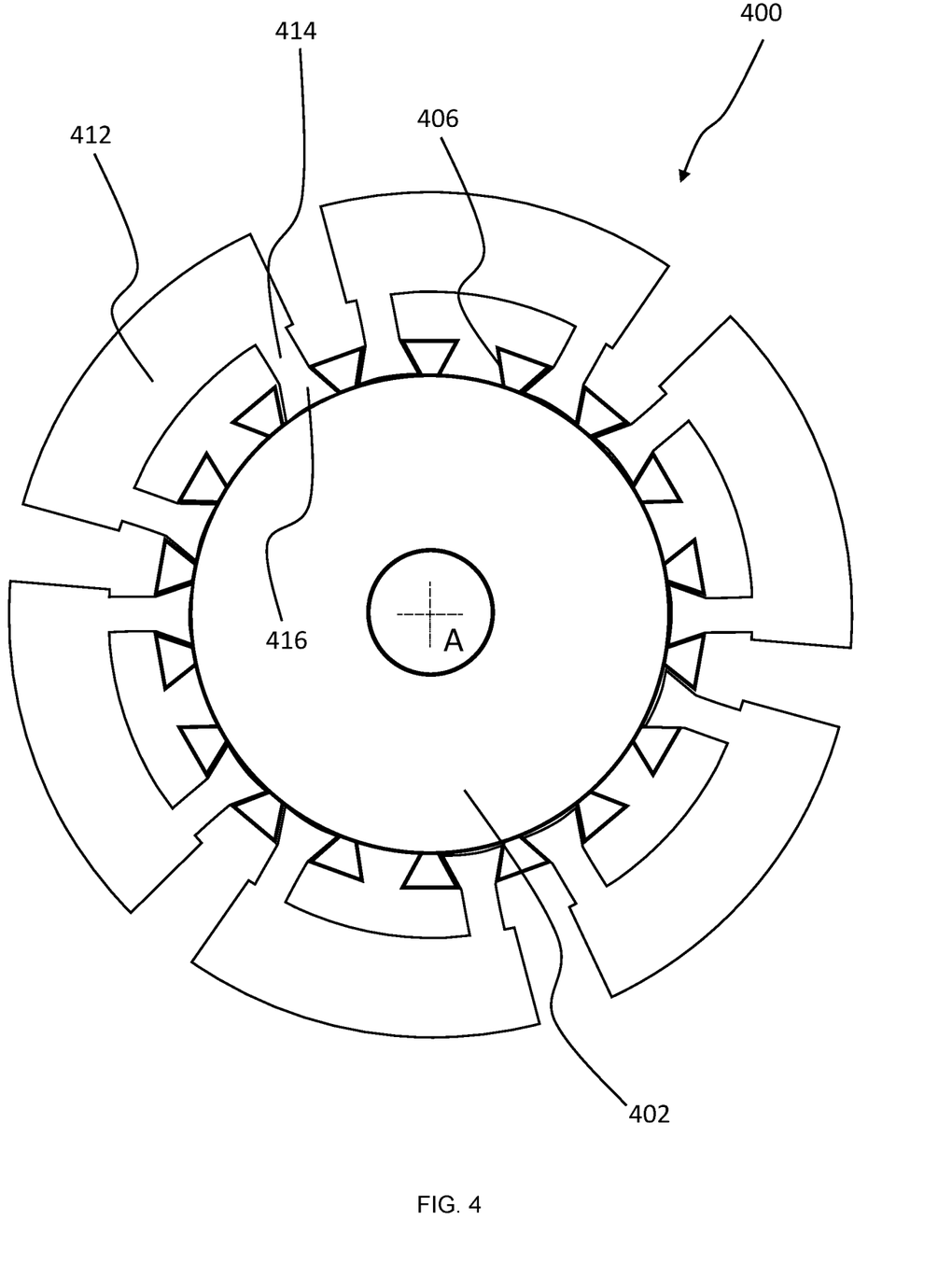
FIG. 4 is a schematic view of a first exemplary balancing simulation apparatus in a first configuration.

Turning now to FIG. 4, an exemplary balancing simulation apparatus 400 is shown. The balancing simulation apparatus 400 is configured to balance a rotary disc, and in particular a fan disc 402. However, it should be understood that the principles of this disclosure can be applied to rotary discs of various types. Like features between FIGS. 2 and 4 are indicated with reference numbers differing by 200.

The fan disc 402 is configured to support a set of fan blades (not shown) and, in particular, eighteen fan blades in this example. The fan disc 202 is configured to be mounted on a shaft (not shown) of a gas turbine engine to be driven rotationally about its centre axis A. The fan disc 402 comprises a plurality of attachment features for the fan blades, in the form of a plurality of root slots 406. The root slots 406 are equally circumferentially spaced around the radially outer surface of the fan disc 402 and are configured to receive a blade root of a fan blade to attach and secure each fan blade to a respective root slot 406. In this example, the root slots 406 and the blade roots have a 'dovetail' configuration to radially restrain the fan blades on the fan disc 402 during rotation. Other configurations, such as a 'fir tree' root, are possible. The fan disc 402 and or the fan blades may comprise further locking features which secure the blades to the disc, such as end caps to prevent axial movement of the blade roots out of the root slots 206.

The balancing simulation apparatus 400 further comprises a rotary disc balancing simulation mass 412 and, in this example, six rotary disc balancing simulation masses 412. Each rotary disc balancing simulation mass 412 is configured to be attached to the fan disc 402 using two feet 414 which are each shaped to be received in a root slot 406. Each foot 414 extends radially inward from the balancing simulation mass 412 and comprises a distal end 416 shaped substantially identically to the blade root of the fan blades with which the fan disc 402 is to be operated. In other examples, each rotary disc balancing simulation mass 412 may have fewer feet, such as one foot, or more feet.

Each rotary disc balancing simulation mass 412 simulates the mass of two or more fan blades. In this example, each rotary disc balancing simulation mass 412 simulates the mass of three fan blades, such that six rotary disc balancing simulation masses 412 simulate the full set of eighteen fan blades which are to be attached to the fan disc 402 in use in a gas turbine engine.

Each rotary disc balancing simulation mass 412 extends circumferentially around the fan disc 402 in this example. In particular, each balancing simulation mass 412 extends across three root slots 406. It will be appreciated that each balancing simulation mass 412 only has two feet 414 which engage with two of the root slots 406. More generally, it should be understood that each balancing simulation mass 412 may be configured to simulate the mass of a number of fan blades, but to attach to fewer root slots than the number of fan blades the mass 414 simulates.

By providing rotary disc balancing simulation masses 412 which simulate the mass of multiple fan blades, fewer masses 412 must be attached to the fan disc 402 for balancing than known balancing systems. This may enable balancing procedures to be achieved more quickly, with less time spent installing and removing components on the fan disc 402, and may provide fewer opportunities for error, as a smaller number of components are required in the balancing apparatus.

Figure 5:
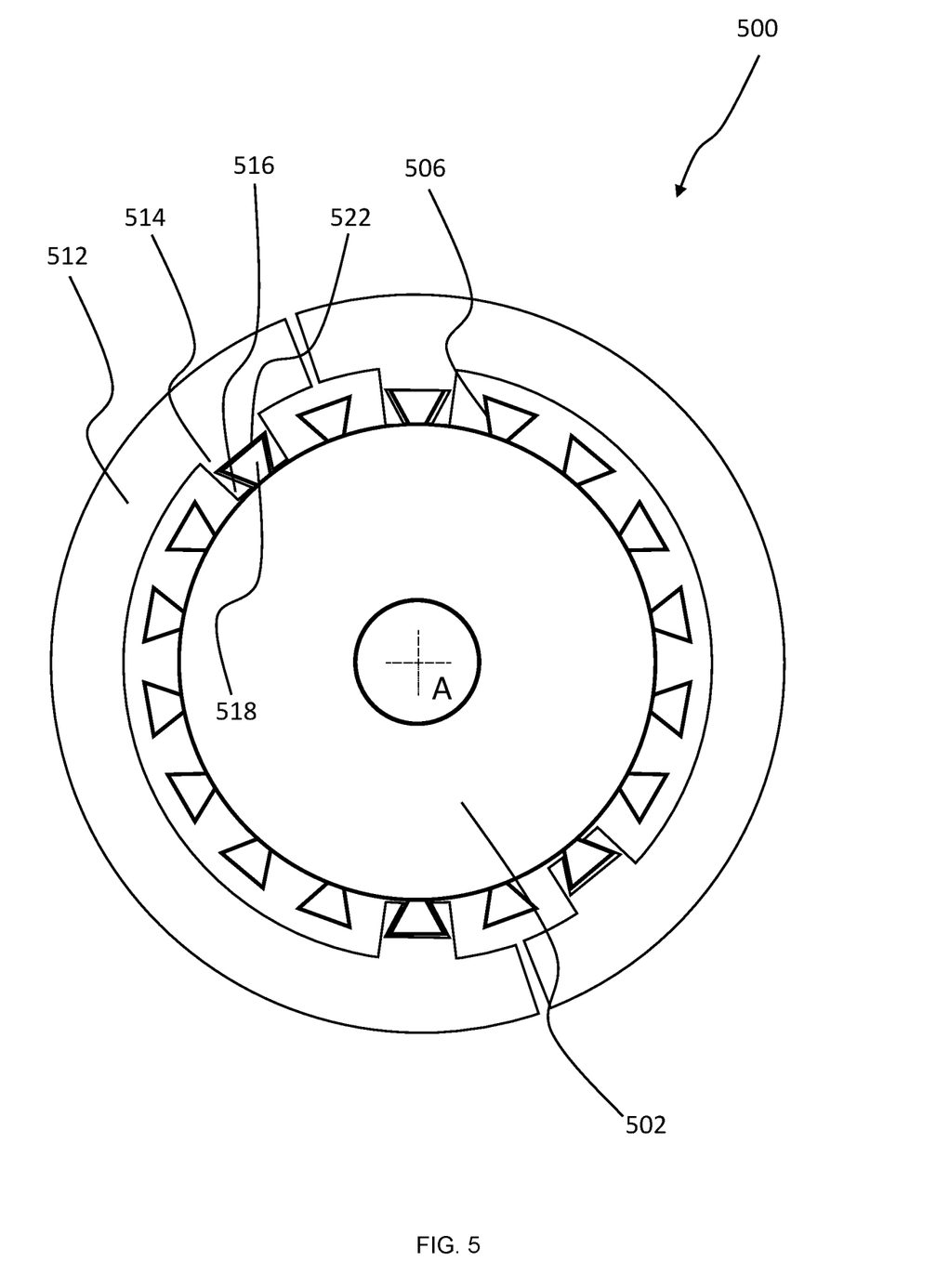
FIG. 5 is a schematic view of a second exemplary balancing simulation apparatus in a second configuration.

FIG. 5 illustrates a second exemplary balancing simulation apparatus 500. The balancing simulation apparatus 500 is configured to balance a rotary disc, and in particular a fan disc 502. However, it should be understood that the principles of this disclosure can be applied to rotary discs of various types. Like features between FIGS. 4 and 5 are indicated with reference numbers differing by 100.

The fan disc 502 takes a substantially identical form to fan disc 402. In this example, only two rotary disc balancing simulation masses 512 are provided, such that each mass 512 simulates half of the set of fan blades with which the fan disc 502 will be utilised.

As the root slots 506 are recessed into the circumferential surface of the fan disc 502, a disc post 518 is formed between each adjacent pair of root slots 506. In this example, each foot 514 of the balancing simulation mass 512 is configured to clamp onto a single disc post 518. In particular, each foot 514 extends radially inward from the balancing simulation mass 512 and comprises a distal end 516 comprising a slot 522 which is shaped to correspond to and receive a disc post 518.

This example further extends the time savings that can be made, as only two balancing simulation masses 512 can simulate the entire set of eighteen fan blades which are to be fitted to the fan disc 502 when in use.

Figure 6A:
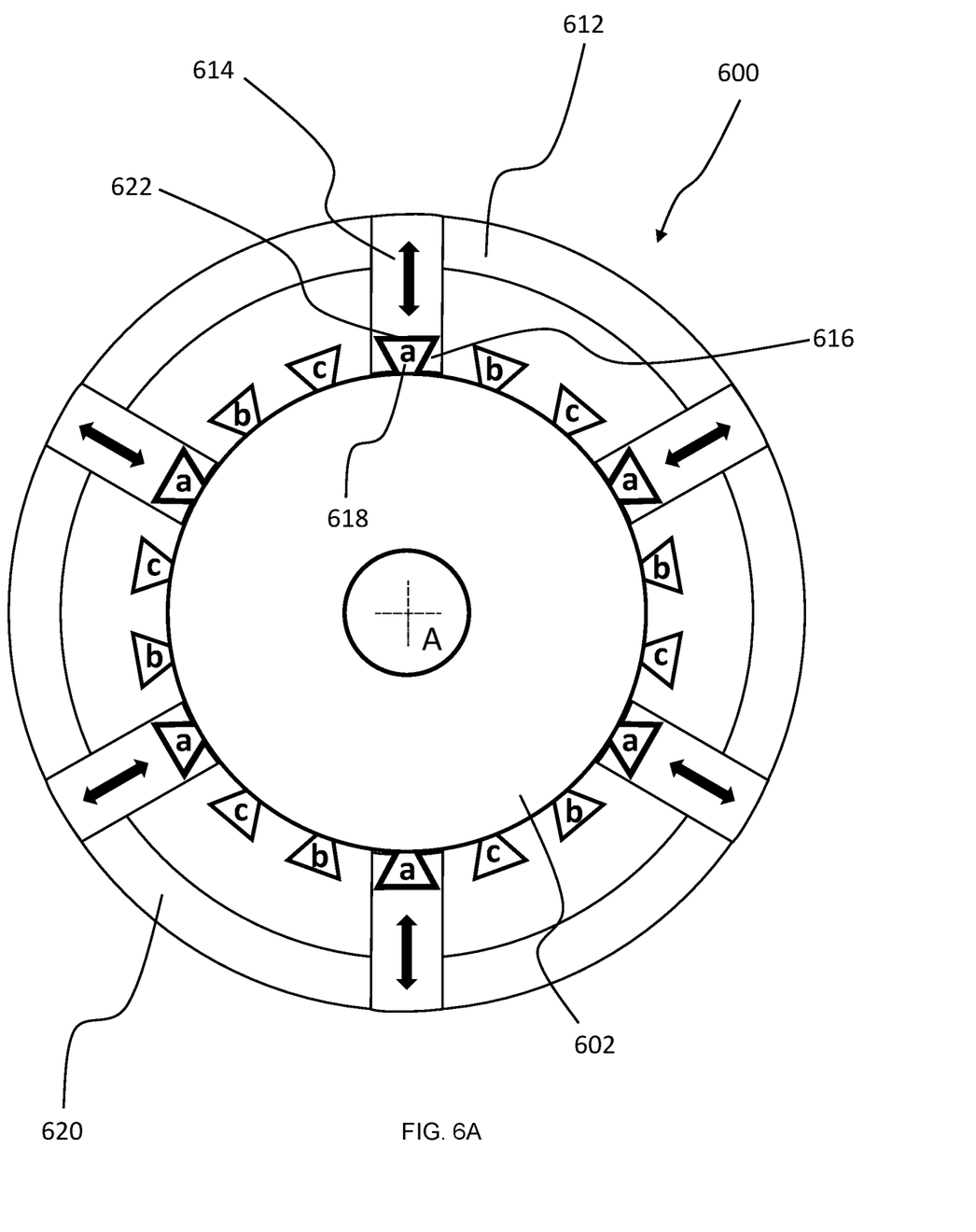
FIG. 6A is a schematic view of a third exemplary balancing simulation apparatus.

Turning now to FIG. 6A, a third exemplary balancing simulation apparatus 600 is shown. The balancing simulation apparatus 600 is configured to balance a rotary disc, and in particular a fan disc 602. However, it should be understood that the principles of this disclosure can be applied to rotary discs of various types. Like features between FIGS. 4 and 6 are indicated with reference numbers differing by 200.

The fan disc 602 takes a substantially identical form to fan discs 402 and 502. In this example, a single rotary disc balancing simulation mass 612 is provided, such that a single mass 612 simulates the entire set of fan blades to be used with the fan disc 602.

The rotary disc balancing simulation mass 612 comprises an annular ring 620 which has an inner diameter larger than the maximum outer diameter of the fan disc 602. The annular shape of the rotary disc balancing simulation mass 612 extends circumferentially around the fan disc 602. In this way, the balancing simulation mass 612 distributes its mass around the entire circumference of the fan disc 602, thereby simulating the set of fan blades which will be circumferentially distributed around the fan disc 602 in use.

The rotary disc balancing simulation mass 612 is configured to be attached to the fan disc 402 using a plurality of feet 614 which are each shaped to be clamped onto a disc post 618. Each foot 614 extends radially inward from the balancing simulation mass 612 and comprises a distal end 616 shaped with a slot 622 to correspond to and receive a disc post 618. In other examples, each rotary disc balancing simulation mass 612 may have fewer feet or more feet.

Each foot 614 is mounted to the annular ring 620 such that it can be moved in the radial direction with respect to the annular ring 620, as shown by the arrows in FIG. 6A. This movement may be achieved using mechanical, hydraulic, or other means. The feet 614 may be individually moveable using separate actuators, or all of the feet 614 may share a common actuation system, such as a shared hydraulic system, such that an equal force can be applied across the feet 614 simultaneously. In this way, each foot 614 can apply compressive or tensive force to the disc post 618 to which it is attached, and thereby apply force to the fan disc 602 to secure the balancing simulation mass 612 to the fan disc 602. Further, as each of the feet 614 is individually radially adjustable relative to the annular ring 620, the exact position of the annular ring 620 relative to the fan disc 602 can be adjusted to provide the most accurate simulation of the fan blades. More generally, the feet 614 are configured to provide a radial force to be reacted against the other feet 614 and thereby secure the rotary disc balancing simulation mass 612 to the fan disc 602.

In the example of FIG. 6, the fan disc 602 comprises eighteen root slots 606 and disc posts 618, which correspond to the eighteen fan blades (see FIG. 2) which will be utilised with the fan disc 602 in use. The rotary disc balancing simulation mass 612 comprises six feet 614 in this example, such that one third of the attachment features (i.e., the root slots 606 and disc posts 618) are engaged by the rotary disc balancing simulation mass 612 whilst it is attached to the fan disc 602. More generally, the number of feet on the rotary disc balancing simulation mass may be a factor of the number of attachment features on the fan disc. This may provide easier and more reliable repositioning of the balancing simulation mass during a balancing procedure.

The rotary disc balancing simulation mass 612 is pre-balanced in order to ensure that any imbalance observed when the mass 612 is attached to the fan disc 602 is a result of imbalance in the fan disc 602 itself.

An exemplary balancing method using a rotary disc balancing simulation mass, and in particular the rotary disc balancing simulation mass 612, will now be described with additional reference to FIGS. 6B, 6C, and 7.

Figure 7:
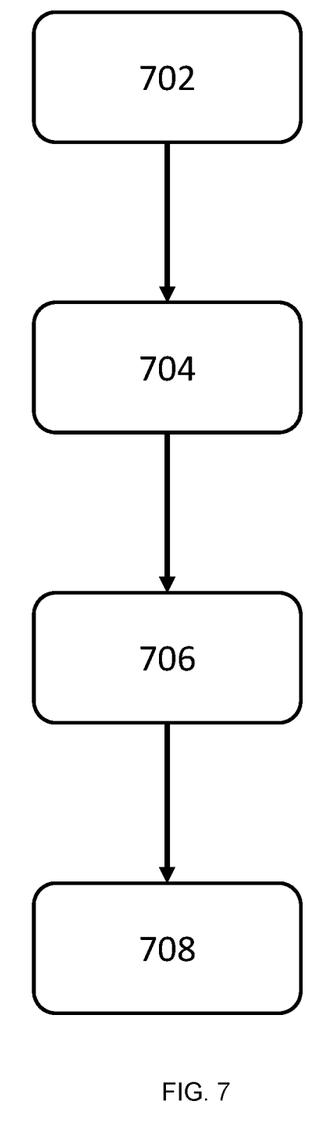
FIG. 7 is a shows an exemplary method of balancing a rotary disc.

In a first box 702 in FIG. 7, the rotary disc balancing simulation mass 612 is attached to six of the disc posts 618 of the fan disc 602 as shown in FIG. 6A, which are notionally labelled "a". It should be understood that the rotary disc balancing simulation mass 612 is shown in FIG. 6 attached to the fan disc 602 in a first relative position "a".

In order to balance the fan disc 602, the balancing simulation apparatus 600 (i.e., the connected fan disc 602 and rotary disc balancing simulation mass 612) are rotated about central axis A using a motor or similar (not shown). Sensors (not shown) such as accelerometers, imaging sensors, and vibration sensors can be used to observe any imbalance in the apparatus 600, which should be as a result of any imbalance in the fan disc 602, because the rotary disc balancing simulation mass 612 is already pre-balanced. This is illustrated in box 704 in FIG. 7.

Figure 6B:
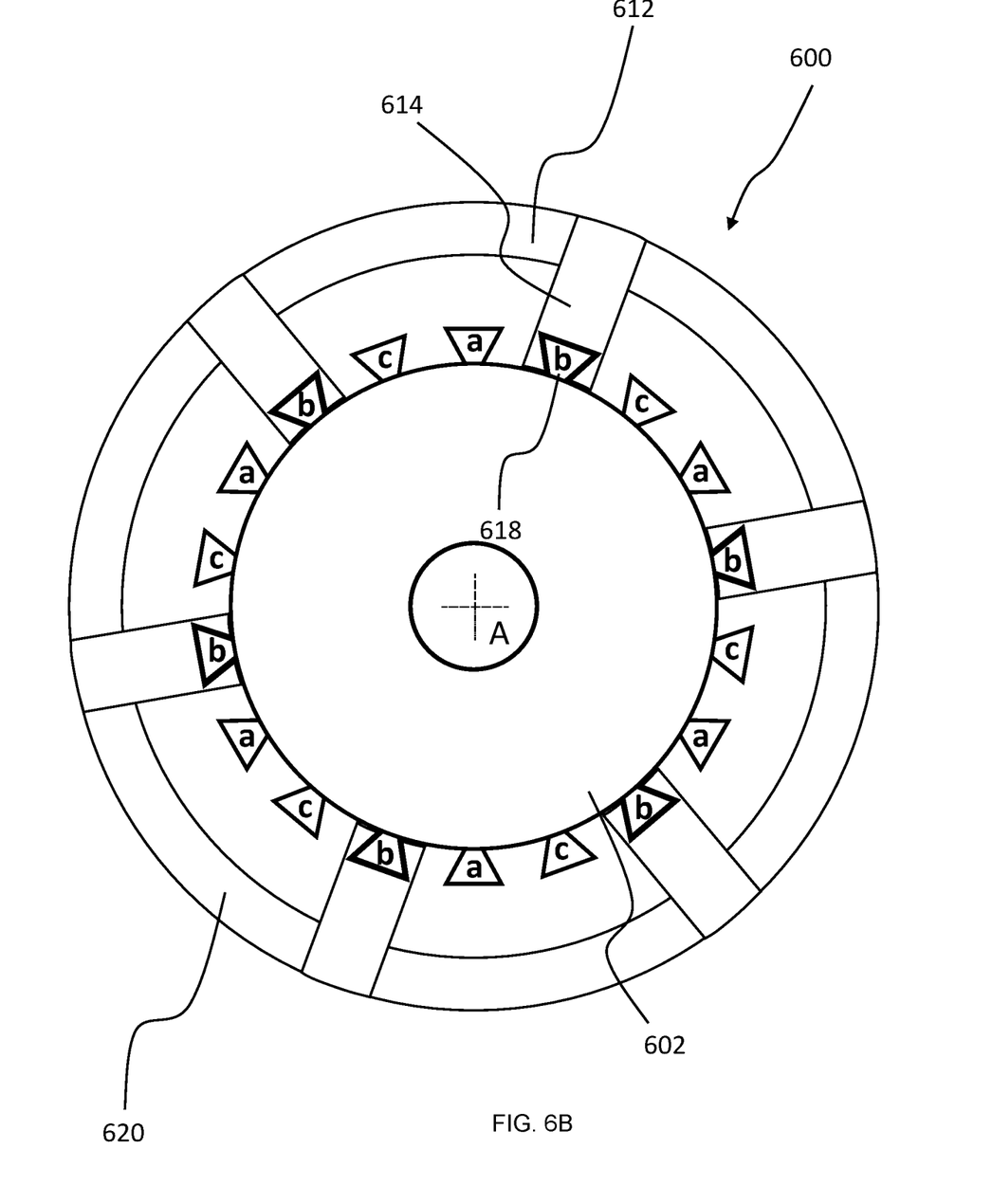
FIGS. 6B and 6C are schematic views of the third exemplary balancing simulation apparatus in an alternative arrangement and a further alternative arrangement.

Next, as shown in box 706 of FIG. 7, the rotary disc balancing simulation mass 612 is detached from the fan disc 602, and reattached to a second set of six disc posts 618, which are notionally labelled "b", as shown in FIG. 6B. The rotary disc balancing simulation mass 612 can be considered to be attached to the fan disc 602 in a second relative position "b".

The balancing simulation apparatus 600 is rotated and observed in a similar manner to that described for box 704 to identify imbalance in the system 600, as shown in box 708.

Figure 6C:
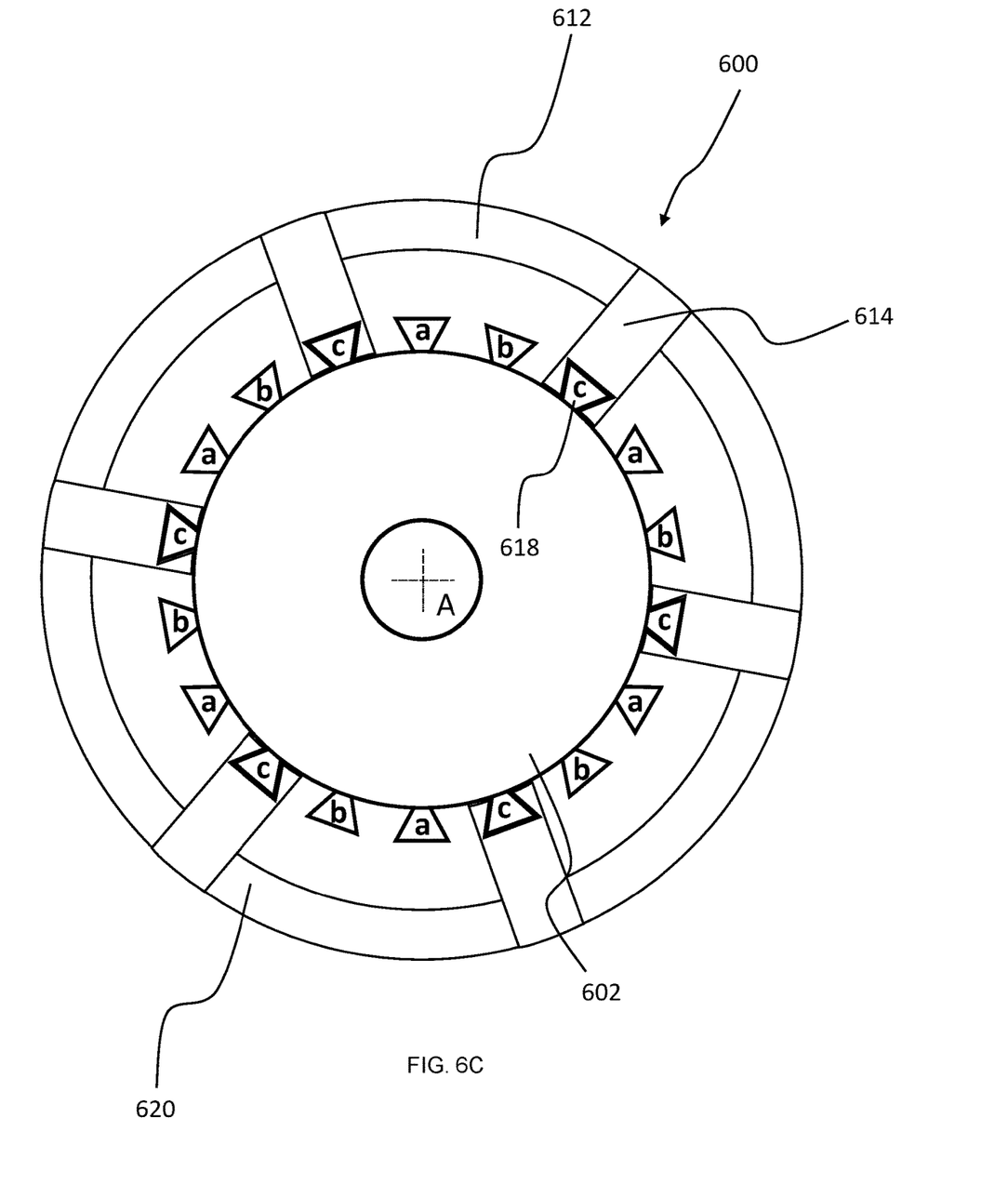

Following the testing in the first and second positions a,b, the rotary disc balancing simulation mass 612 is then reattached to the fan disc 602 in a third position "c", connected to the remaining six disc posts 618 which are notionally labelled "c" as shown in FIG. 6C. The rotation and observation made in boxes 704, 708 can then be repeated in this position.

Following the testing of the apparatus 600 in all three positions a,b,c, the rotary disc balancing simulation mass 612 has been in contact with every one of the disc posts 618. As the number of feet 614 (i.e., six) is a factor of the number of disc posts 618 (i.e., eighteen), the rotary disc balancing simulation mass 612 is only required to be repositioned twice in order to engage with and be assessed in contact with all of the disc posts 618.

Testing with the rotary disc balancing simulation mass 612 in multiple positions may enable any minor remaining imbalance in the rotary disc balancing simulation mass 612 to be accounted for, and may further provide the opportunity for any balancing issues which result from a defective disc post 618 to be identified.

It should be understood that the mass characteristics of the rotary disc balancing simulation masses described above will be specific to the exact simulation requirements. For example, fan blades are significantly larger than turbine blades, so when a rotary disc balancing simulation mass is being used to simulate fan blades on a fan disc, the total mass and size of the rotary disc balancing simulation mass is likely to be larger than when it is being used to simulate turbine blades on a turbine disc. It will be appreciated that the rotary disc balancing simulation mass or masses can be designed or adapted to simulate the mass of the particular rotary components in question, and thereby apply equivalent forces to the rotary disc to those caused by the set of rotary components. Consequently, the rotary disc can be balanced without needing to attach the actual rotary components in a faster, easier, and more accurate procedure.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. In particular, features of the rotary disc balancing simulation masses disclosed herein may be combined, except where those features are mutually exclusive.

What is claimed is:

1. A rotary disc balancing simulation mass for balancing a rotary disc configured to support a set of rotary components, wherein the rotary disc balancing simulation mass is configured to be attached to the rotary disc and configured to simulate the mass of two or more of the rotary components.

2. The rotary disc balancing simulation mass as claimed in claim 1, wherein the rotary disc to which the rotary disc balancing simulation mass is configured to be attached comprises a plurality of attachment features corresponding to the set of rotary components, and wherein the rotary disc balancing simulation mass is further configured to:
   simulate the mass of a first number of the set of rotary components, the first number being two or more; and
   attach to a second number of the plurality of the attachment features, the second number being less than the first number.

3. The rotary disc balancing simulation mass as claimed in claim 1, wherein the set of rotary components are configured to be circumferentially spaced around the rotary disc, and wherein the rotary disc balancing simulation mass is configured to extend at least partially circumferentially around the rotary disc whilst attached to the rotary disc.

4. The rotary disc balancing simulation mass as claimed in claim 1, wherein the rotary disc balancing simulation mass comprises a substantially annular mass configured to extend substantially circumferentially around the rotary disc, and wherein the rotary disc balancing simulation mass is configured to simulate the mass of the entire set of rotary components.

5. The rotary disc balancing simulation mass as claimed in claim 1, wherein the set of rotary components consists of a third number of rotary components and the disc comprises the third number of attachment features corresponding to the set of rotary components, and wherein the rotary disc balancing simulation mass comprises a fourth number of attachment features for attaching to the rotary disc, the fourth number being a factor of the third number.

6. The rotary disc balancing simulation mass as claimed in claim 1, further comprising one or more radially extending feet configured to be attached to the rotary disc.

7. The rotary disc balancing simulation mass as claimed in claim 6, wherein the rotary disc balancing simulation mass comprises a plurality of radially extending feet and wherein at least one of the radially extending feet is configured to provide a radial force to be reacted against the other radially extending feet and thereby secure the rotary disc balancing simulation mass to the rotary disc.

8. The rotary disc balancing simulation mass as claimed in claim 1, wherein the rotary disc comprises a plurality of root slots corresponding to the set of rotary components and a plurality of disc posts positioned between the root slots, wherein the rotary disc balancing simulation mass comprises one or more attachment features configured to:
   i) be received in one or more of the root slots; and/or
   ii) attach to one or more of the disc posts, optionally by clamping.

9. The rotary disc balancing simulation mass as claimed in claim 1, wherein the rotary disc is a rotor of a gas turbine engine, optionally a fan disc, a compressor disc, or a turbine disc of a gas turbine engine, and wherein the rotary components are blades to be supported by the rotor, optionally fan blades, compressor blades, or turbine blades.

10. A balancing simulation mass apparatus comprising a plurality of rotary disc balancing simulation masses as claimed in claim 1, wherein the plurality of rotary disc balancing simulation masses is configured to simulate the entire set of rotary components.

11. A balancing simulation apparatus comprising:
   a rotary disc to be balanced, the disc being configured to support a plurality of circumferentially spaced rotary components; and
   a rotary disc balancing simulation mass as claimed in claim 1, or a balancing simulation mass apparatus and configured to simulate the mass of two or more of the rotary components.

12. A method of balancing a rotary disc, the method comprising:
   providing a rotary disc configured to support a plurality of rotary components;
   attaching a balancing simulation mass to the rotary disc in a first position, the balancing simulation mass being configured to simulate the mass of two or more of the rotary components; and
   rotating the rotary disc with the balancing simulation mass attached.

13. The method of balancing a rotary disc as claimed in claim 12, further comprising:
   detaching the balancing simulation mass from the rotary disc;
   reattaching the balancing simulation mass to the rotary disc in a second position different from the first position; and
   rotating the rotary disc with the balancing simulation mass reattached.

14. The method of balancing a rotary disc as claimed in claim 12, wherein the balancing simulation mass is a rotary disc balancing simulation for balancing a rotary disc configured to support a set of rotary components, wherein the rotary disc balancing simulation mass is configured to be attached to the rotary disc and configured to simulate the mass of two or more of the rotary components or a balancing simulation mass apparatus comprising a plurality of rotary disc balancing simulation masses wherein the plurality of rotary disc balancing simulation masses is configured to simulate the entire set of rotary components.

* * * * *